United States Patent [19]

Capra

[11] 4,192,037

[45] Mar. 11, 1980

[54] WHEEL-SCRUBBING MECHANISM FOR VEHICLE-WASHING APPARATUS

[76] Inventor: Uberto Capra, Alte Ceccato, Italy

[21] Appl. No.: 933,981

[22] Filed: Aug. 15, 1978

[51] Int. Cl.² .............................................. B60S 3/06
[52] U.S. Cl. ................................. 15/53 B; 15/DIG. 2
[58] Field of Search .......................... 15/DIG. 2, 53 B

[56] References Cited

U.S. PATENT DOCUMENTS

| 2,814,825 | 12/1957 | Guthrie, Jr. et al. | 15/53 B |
| 2,975,446 | 3/1961 | Furman et al. | 15/53 B |
| 2,978,718 | 4/1961 | Vani et al. | 15/53 B |
| 3,208,089 | 9/1965 | Vani | 15/53 B |
| 3,758,906 | 9/1973 | Takeuchi | 15/53 B |

FOREIGN PATENT DOCUMENTS

1655989  8/1971  Fed. Rep. of Germany ........... 15/53 B

*Primary Examiner*—Edward L. Roberts
*Attorney, Agent, or Firm*—Karl F. Ross

[57] ABSTRACT

A portal frame of a vehicle-washing station, carrying cylindrical brushes for scrubbing the body of a vehicle moving relatively to that frame, supports a pair of oppositely disposed wheel-cleaning units with respective rotary brushes confronting the sides of the vehicle at the level of its wheels. Each wheel-cleaning unit comprises a feeler, normally retracted, which at the beginning of a traverse is extended into the path of the proximal wheel pair to sense the arrival of the leading wheel in a scrubbing position. The feeler then causes the arrest of the main drive and the advancement of the associated wheel-scrubbing brush into contact with the vehicle wheel so positioned; the same happens with the wheel-cleaning unit at the opposite side. During this operation the feeler is again retracted; when relative motion of the vehicle and the portal frame resumes, the feeler is again extended to repeat the aforedescribed procedure with the trailing vehicle wheel.

8 Claims, 9 Drawing Figures fig. 1

WHEEL-SCRUBBING MECHANISM FOR VEHICLE-WASHING APPARATUS

FIELD OF THE INVENTION

My present invention relates to a wheel-scrubbing mechanism to be used in a car-washing station along with conventional apparatus for scrubbing the body of an automotive vehicle.

BACKGROUND OF THE INVENTION

Such vehicle-washing stations generally include a bridge structure or portal frame serving as a support for cylindrical scrubbing brushes which rotate about substantially horizontal and vertical axes while contacting the body of the vehicle to be cleaned; see, for example, my prior U.S. Pat. Nos. 3,793,667 and 3,688,329. The portal frame and the vehicle move relatively to each other during the cleaning operation, along a predetermined path, with the portal frame traveling along a track while the vehicle is standing still or, conversely, with the vehicle entrained by a chain or the like past the stationary frame. These body-scrubbing brushes, however, cannot clean the vehicle wheels which are generally recessed in respective housings or wells below their fenders.

There are already known a number of wheel-cleaning devices using rotary brushes that are carried on horizontal shafts which in operation are aligned with the respective wheel axles. In some of these instances, the wheel-scrubbing brushes are actuated by sensors designed to detect the alignment of a vehicle wheel with the device. Such a sensor may be a flexible rod extending transversely to the path of relative vehicle motion across the course of the wheels to be scrubbed, a signal generated upon the deflection of the rod by an oncoming wheel serving to arrest the portal-frame or vehicle drive and to advance the wheel-scrubbing brush into operative engagement with the confronting vehicle wheel. A drawback of this arrangement is that the rod, lying necessarily at a relatively low level above the ground, may be tripped accidentally by an object other than a vehicle wheel and may therefore cause untimely triggering of the wheel-cleaning device. There is also the danger that the flexible rod may be dragged down by the tire and get caught between the wheel and the ground (or possibly the driving chain entraining the vehicle) with resulting breakdown of the system.

Other known wheel-cleaning devices dispense with a separate sensor and use brushes which are biased under light pressure against the passing vehicle body in order to enter the well of a wheel arriving in its aligned position; the forward motion of the brush then actuates its drive motor to start the cleaning operation. Although such an arrangement obviates the aforementioned drawbacks, its disadvantage lies in the fact that the wheel-scrubbing brush must scrape the sides of the vehicle body before and after operating on a wheel. This scraping action, especially if the car is very dirty, may lead to scratches and abrasions of the vehicular coating.

OBJECT OF THE INVENTION

The object of my present invention, accordingly, is to provide an improved wheel-cleaning unit which is free from all the above-discussed disadvantages.

SUMMARY OF THE INVENTION

A wheel-cleaning unit according to my invention, mounted on a support such as a portal frame alongside the path of a vehicle moving relatively to this support, comprises rotary wheel-scrubbing means (referred to hereinafter, for convenience, as a brush) normally laterally retracted from that path and linked with the support by reciprocable transport means such as a fluidically actuatable jack. A normally withdrawn feeler is extendible across the course of a vehicle wheel to be scrubbed and, when in an extended position, responds to contact with an oncoming vehicle wheel by triggering switch means into operative engagement with that wheel while activating the brush drive.

Although one such wheel-cleaning unit might be used to operate successively on all the wheels of a vehicle, as when the latter passes over a turntable between scrubbings, it will generally be convenient to provide a pair of substantially identical rotary brushes and drive means therefor on opposite sides of the vehicle path, e.g. on the jambs of a portal frame straddling that path. Only one of these units, however, needs to be provided with a retractable feeler according to my invention which then controls the operation of both rotary brushes upon encountering one of the vehicle wheels on the corresponding side of the vehicle. Since the two wheel-scrubbing units are otherwise identical, it will be sufficient hereinafter to discuss the unit equipped with the feeler.

According to a more particular feature of my invention, the movement of the feeler into the vehicular path is brought about by actuating means programmed to extend the feeler upon the approach of a vehicle wheel to be cleaned, the aforementioned switch means being part of a control circuit for arresting the relative displacement of the vehicle and the brush support and for withdrawing the feeler prior to the operative engagement of the scrubbing brush with the wheel. If this wheel happens to be the leading one as seen in the direction of relative vehicle motion, the actuator is programmed to re-extend the feeler after the first wheel-scrubbing operation into the path of the oncoming second or trailing wheel on which the same scrubbing operation is thereafter carried out.

In accordance with a further feature of my invention, the feeler comprises a rigid member such as a rod or bar connected with its actuator by a limitedly yieldable spring-loaded coupling whereby the associated switch means, placed in an off-normal condition when the feeler is first extended, is restored to normal when the rod is deflected by the oncoming vehicle wheel against the loading force of that coupling. This two-way switchover prevents any untimely halting of the body-scrubbing operations or activation of the wheel-scrubbing units.

BRIEF DESCRIPTION OF THE DRAWING

The above and other features of my invention will now be described in detail with reference to the accompanying drawing in which.

SPECIFIC DESCRIPTION

Figure 1:
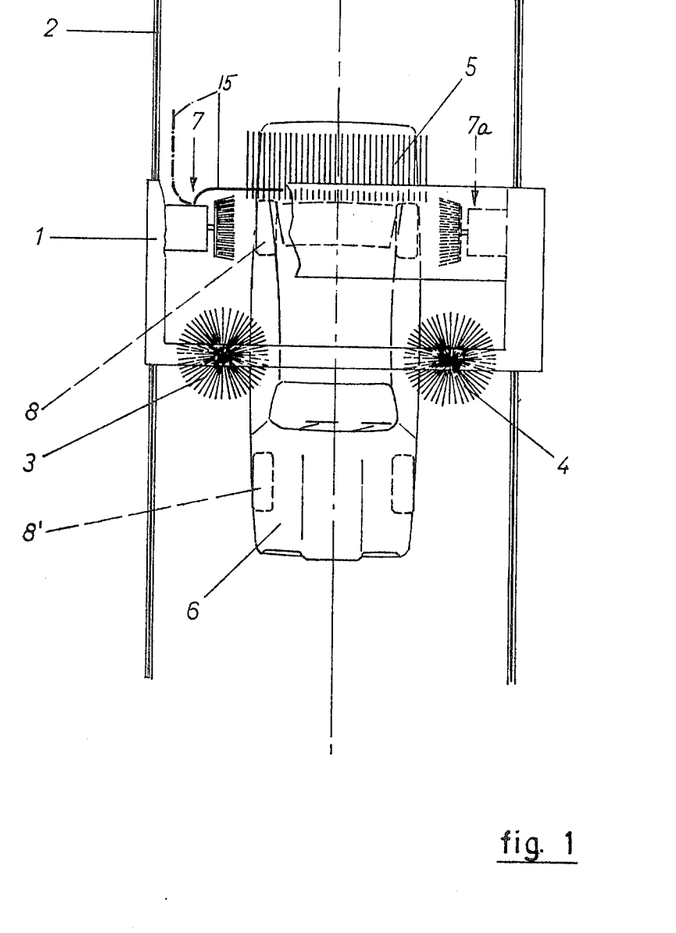
FIG. 1 is a diagrammatic top view of a vehicle-washing station embodying my invention.
Figure 2:
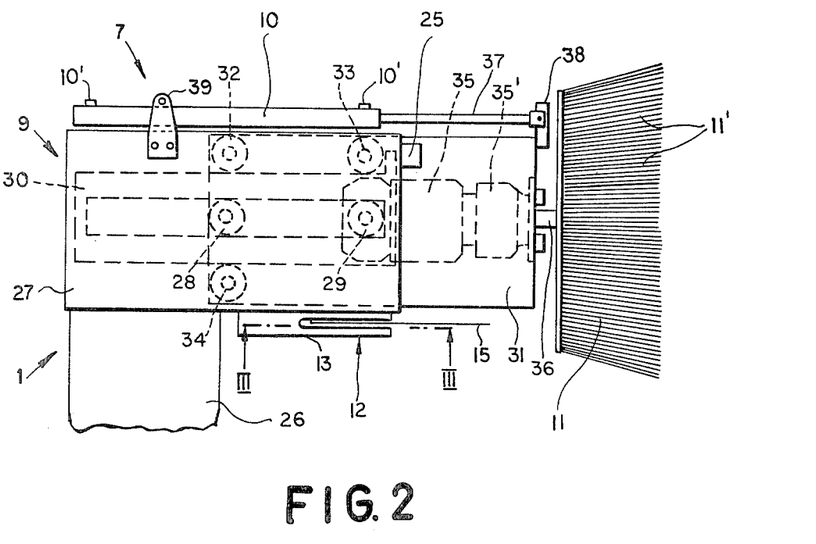
FIG. 2 is a side view, drawn to a larger scale, of a wheel-cleaning unit forming part of the installation of FIG. 1, the unit being shown in an intermediate position.

In FIG. 1 I have shown a vehicle-washing station comprising a portal frame 1 straddling a vehicle 6 to be washed, the frame being linearly reciprocable on a pair of rails 2 paralleling the longitudinal centerline of the vehicle. The conventional body-scrubbing equipment of this installation comprises a pair of vertical cylindrical brushes 3, 4 and a horizontal cylindrical brush 5. The rear and front wheels of vehicle 6, shown at 8 and 8', can be scrubbed by two laterally disposed wheel-cleaning units 7 and 7a which are substantially identical except for the presence of a feeler 15 on unit 7. This feeler is swingable, as will be described hereinafter, through about 90° between a withdrawn position parallel to the rails 2 (shown in dot-dash lines) and an extended position transverse thereto (shown in full lines).

FIGS. 2 and 6-8 show the wheel-cleaning unit 7 in greater detail. The unit comprises a telescopic assembly 9 including a yoke-shaped casing 27 and a carriage 31 normally received therein, casing 27 resting fixedly on a base 26 which is fixedly mounted on the portal frame 1 of FIG. 1. A double-acting pneumatic jack has a cylinder 10 and a piston 37, the latter being anchored to a lug 38 rigid with carriage 31 while the cylinder is secured to casing 27 by brackets 39. Carriage 31 accommodates a reversible electric motor 35 whose output shaft 36, driven via a speed reducer 35', carries a rotary brush 11 provided with a frustoconical array of bristles 11'. The diameter of this array at its larger, outer end is at least equal to that of the largest vehicle wheel to be scrubbed.

Each of the two sidewalls of casing 27 carries a pair of rollers 28, 29 supporting a respective slide 30 which is engaged at the top by two rollers 32, 33 and at the bottom by a further roller 34 all mounted on carriage 31. Each slide 30 is further provided with an upstanding lug 30' entrainable via roller 33 by the advancing carriage 31. Cylinder 10 has two ports 10' and 10", the admission of compressed air to port 10' in the position of FIG. 6 establishing first the intermediate position of FIG. 2 and then the advanced position of FIG. 7; when the carriage is retracted by the admission of compressed air to port 10", lateral projections 31' at the front of the brush carriage restore the slides 30 to normal.

Figure 6:
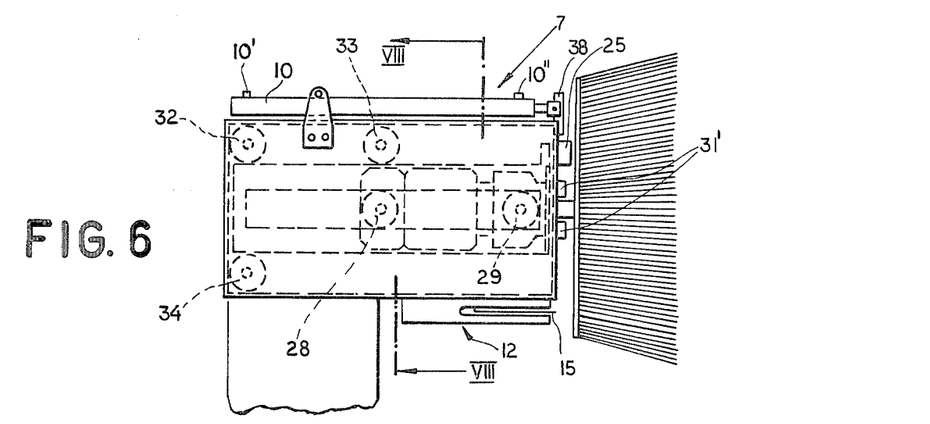
FIGS. 6 and 7 are views similar to FIG. 2 but showing the wheel-cleaning unit in a retracted position and in an advanced position, respectively.
Figure 7:
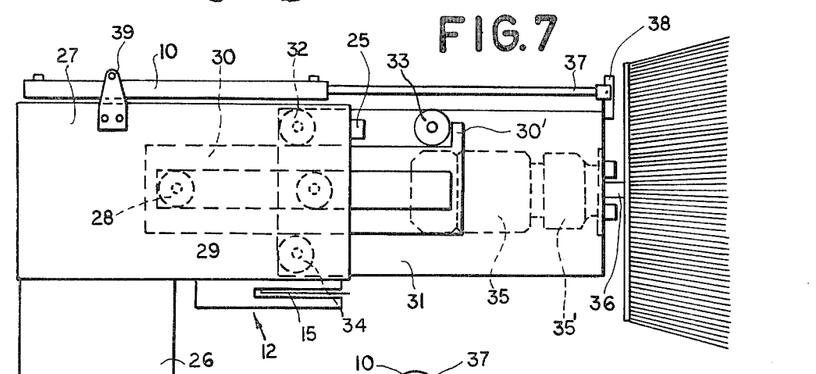
Figure 8:
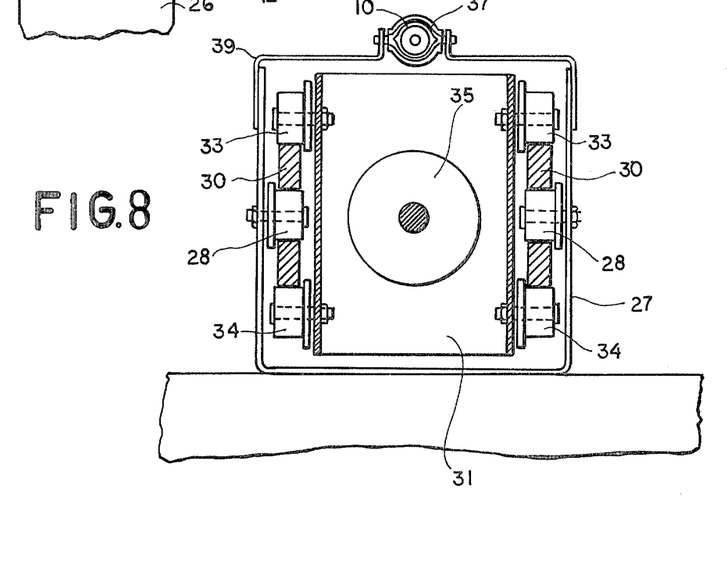
FIG. 8 is a cross-sectional view taken on the line VIII—VIII of FIG. 6.

A switch 25 at the front of casing 27 senses the removal of carriage 31 from its normal position of FIG. 6. Switch 25 may be of the magnetic type responsive to the presence of a ferrous element in its vicinity, such as the adjoining sidewall of carriage 31 or a strip disposed on that sidewall. In the present instance it will be assumed that switch 25 is open whenever brush 11 is advanced beyond the withdrawn position of FIG. 6.

Figure 3:
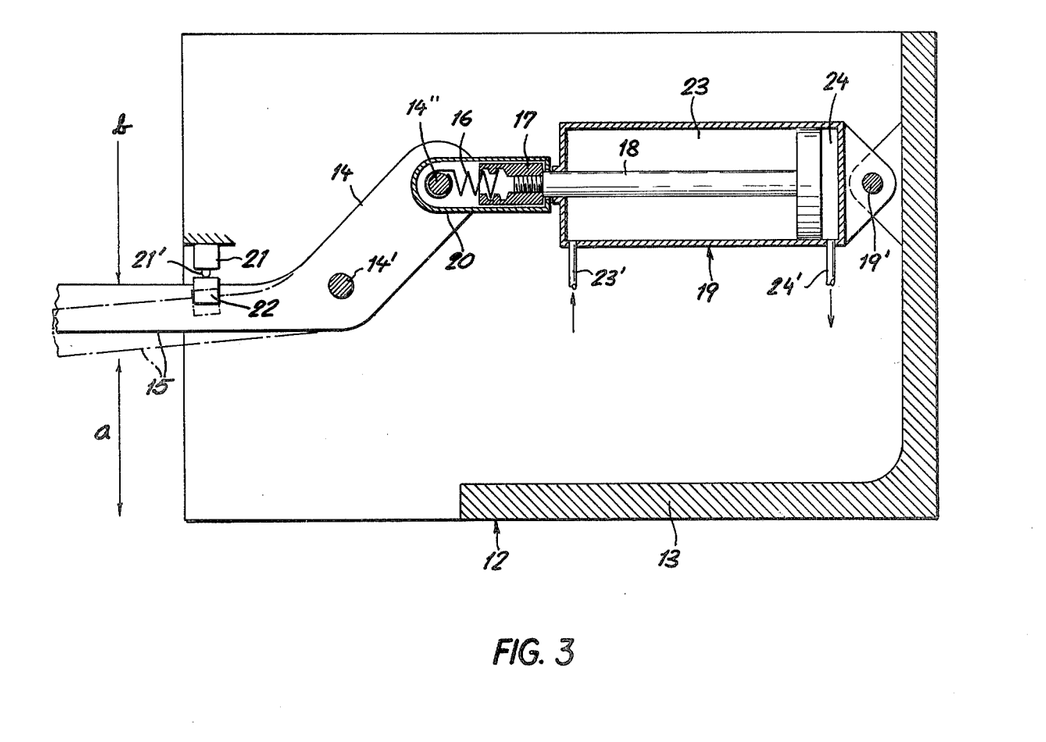
FIG. 3 is a further-enlarged sectional detail view taken on the line III—III of FIG. 2, showing a feeler of the wheel-cleaning unit in an extended position.
Figure 4:
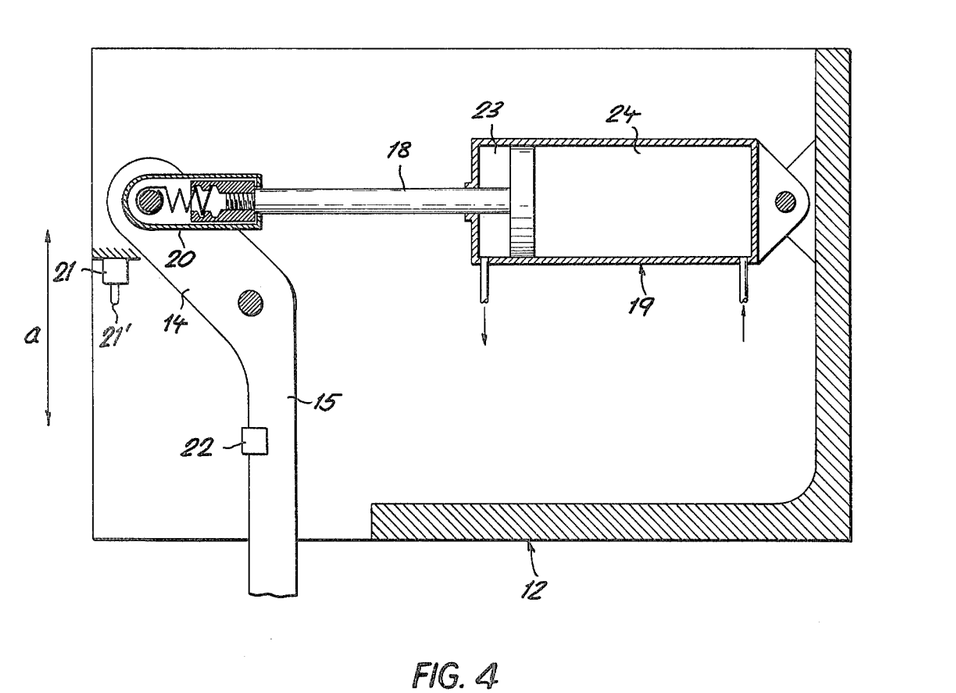
FIG. 4 is a view similar to FIG. 3, showing the same feeler in a retracted position.

The underside of casing 27 supports a sensing device, generally designated 12, more fully illustrated in FIGS. 3 and 4. This device comprises a flat, laterally open housing 13 in which a shank 14 of feeler 15 is fulcrumed on a pin 14'. Shank 14 is anchored via a pin 14" to a helical spring 16 whose opposite end is threaded into a sleeve 17 which in turn is screwed onto the rod of a piston 18 forming part of a double-acting pneumatic jack 19. The cylinder of jack 19, divided by the piston head into two chambers 23 and 24, is pivoted to the housing 13 at 19'. Chambers 23 and 24 can be alternately pressurized via respective ports 23' and 24'. Upon pressurization of chamber 24 (FIG. 4), feeler 15 is withdrawn into its normal position substantially parallel to the direction of relative vehicle motion which has been indicated by an arrow a in FIGS. 3 and 4; the admission of compressed air into chamber 23, as shown in FIG. 3, extends the feeler rod substantially perpendicularly across the course of vehicle wheels 8 and 8' shown in FIG. 1. Pivot pin 14", coil spring 16 and sleeve 17 are encased in a protective cap 20 allowing the spring to be stretched to the necessary extent.

Housing 13 is further provided with a switch 21 comprising a pushbutton 21' which in the extended position of FIG. 3 is engaged by a lug 22 on rod 15 as long as this rod is not in contact with a vehicle wheel. Upon the occurrence of such contact, as symbolized by arrow b, rod 15 is slightly displaced (as indicated in dot-dash lines) to the extent permitted by its limitedly yieldable coupling 16, 17, thereby disengaging the pushbutton 21' to restore the switch 21 to its normal condition corresponding to that of FIG. 4.

Figure 5:
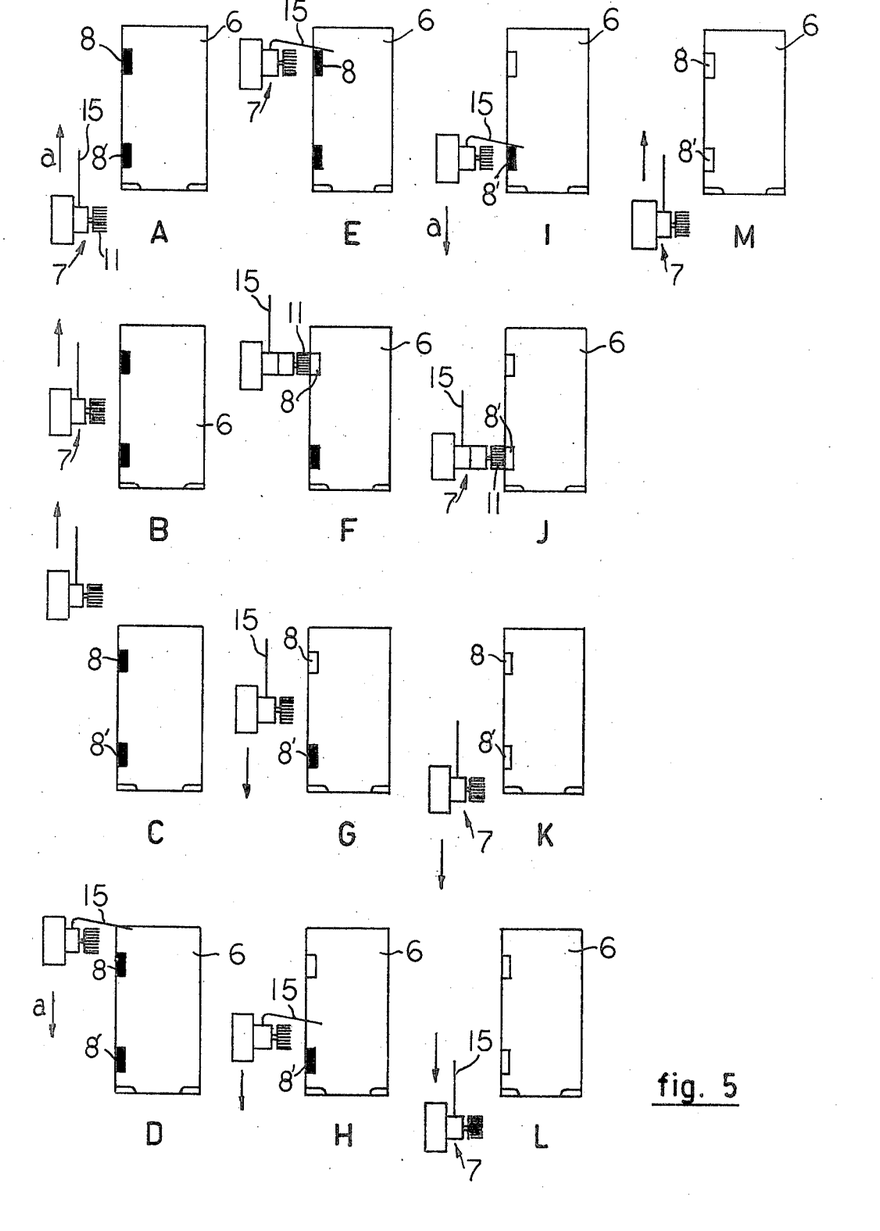
FIG. 5 is a set of diagrammatic views illustrating the mode of operation of the wheel-cleaning unit.

Reference will now be made to FIG. 5 showing, in views labeled A-M, the operation of wheel-cleaning unit 7 during a traverse of the portal frame by the vehicle.

It will be assumed that, in this installation, portal frame 1 (FIG. 1) executes at least one full reciprocation with a stroke exceeding the length of the vehicle, this reciprocation including a first traverse (views A-C) in one direction and a second traverse (views D-L) in the opposite direction; the first traverse serves only for conventional body-scrubbing operations. Thus, unit 7 is inoperative in positions A, B and C in which the portal frame moves (arrow a) from the front to the rear of the vehicle. At the end of this traverse, i.e. in position D, rod 15 is extended across the course of the left-hand rear and front wheels 8 and 8' so as to come to lie at a certain distance from the wheel 8 which is in leading position as seen from the portal frame. In position E the frame has moved forward sufficiently to let the rod 15 contact the wheel 8 and to reverse the switch 21 (FIGS. 3 and 4) so as to initiate a wheel-cleaning operation, with halting of the frame movement and advance of the brush 11 into a wheel-engaging position as shown in view F; the rod 15 is being withdrawn at the same time into its normal position. Next, according to view G, brush 11 is retracted and frame motion is resumed with the rod 15 still withdrawn. In position H this rod is again extended as the trailing wheel 8' approaches. View I represents the position in which the latter wheel is contacted by rod 15 whereupon unit 7 is activated in the same manner as before in order to clean the front wheel 8' (position J), again with withdrawal of feeler 15 from its extended position. Upon completion of this second scrubbing procedure, unit 7 is again retracted and the frame resumes its motion as shown in view K. View L illustrates the arrival of unit 7 on the portal frame in the final position which corresponds to the starting position of view A. A third traverse may thereupon take place, as seen in view M, with no further intervention of unit 7 but with additional body-cleaning operations.

The opposite wheel-cleaning unit 7a (FIG. 1) operates concurrently with unit 7 to scrub the right-hand wheels of the vehicle which have not been illustrated in FIG. 5.

Figure 9:
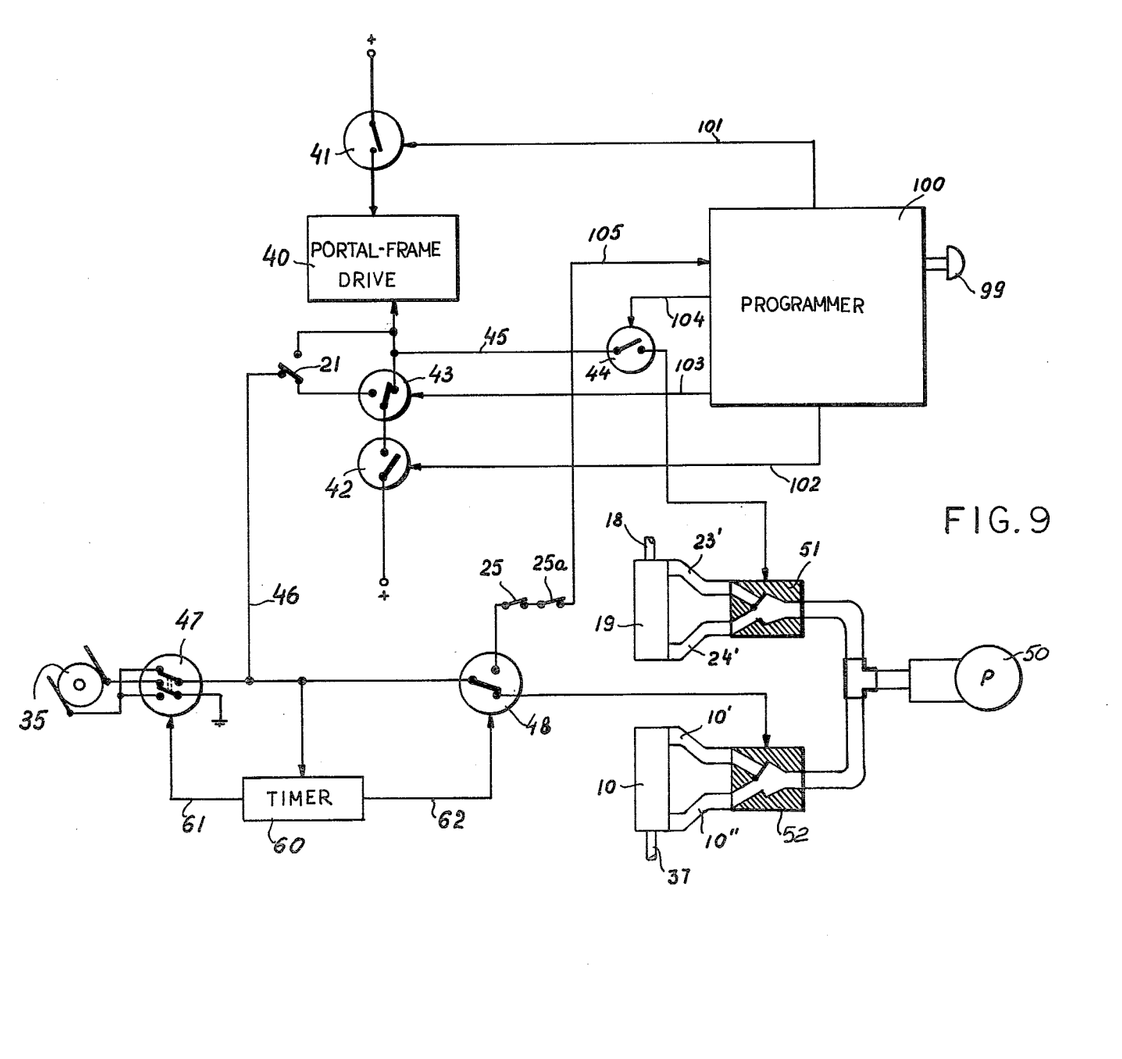
FIG. 9 is a diagram of an electropneumatic control system associated with the wheel-cleaning unit of FIGS. 2-8.

In FIG. 9 I have shown details of an electropneumatic control system, including the switches 21 and 25 already referred to, designed to carry out the various operations discussed with reference to FIG. 5. The relative reciprocation between the wheel-cleaning units and the vehicle is brought about by a portal-frame drive 40 under the control of a programmer 100 which may be manually started by a pushbutton 99 when the vehicle and the portal frame are in position A of FIG. 5. Programmer 100 then energizes an output lead 101 to close a switch 41 in order to supply power from a suitable source (+) to a first input of frame drive 40. The programmer also controls, in a conventional manner not relevant to the present invention, the operations of brushes 3–5 (FIG. 1) during the several traverses.

At the end of the first traverse (position C of FIG. 5), programmer 100 de-energizes its lead 101 and energizes, instead, an output lead 102 to close a switch 42 whereby current is supplied to a second input of portal-frame drive 40 for reversing the movement of the brush support. Switch 42 lies in series with another switch 43 which, thereafter, is reversed by the energization of a further programmer lead 103. Prior to this reversal, however, a switch 44 in a line 45 energized via switches 42 and 43 is closed by voltage on still another programmer lead 104 to reverse an electromagnetic valve 51 for the purpose of admitting high-pressure air from a compressor 50 to the inlet 23' of jack 19, thereby causing a clockwise swing of rod 15 (as viewed in FIGS. 3 and 4) with resulting reversal of switch 21 by its contact with lug 22. In this off-normal condition of switch 21, an alternate circuit for the energization of frame drive 40 is established upon the reversal of switch 43 by the programmer. This situation corresponds to position D of FIG. 5.

With the frame motion now dependent upon the condition of switch 21, that motion is halted as soon as the rod 15 contacts the wheel 8 and is deflected into the dot-dash position of FIG. 3 to restore the switch 21 to normal. With leads 102, 103 and 104 still energized, current now flows over a line 46 and a reversing switch 47 to motor 35 to start the rotation of brush 11; a branch of line 46 extends via a switch 48 to another electromagnetic valve 52 which is now switched to admit air from compressor 50 into inlet port 10' of cylinder 10 whereby the brush carriage 31 is advanced from the position of FIG. 6 into that of FIG. 7. Simultaneously, a timer 60 is set in operation while unit 7 is in the working position shown at F in FIG. 5. With the restoration of switch 21 to the position illustrated in FIG. 9, line 45 is cut off so that valve 51 returns to normal under a nonillustrated spring force and readmits compressed air to port 24' of jack 19, thereby withdrawing the rod 15 into the position of FIG. 4.

With the portal frame at standstill, brush 11 continues its scrubbing operation until timer 60 energizes a lead 61 which reverses the switch 47 and, with it, the sense of rotation of motor 35. Brush 11, now rotating in the opposite direction, continues to operate until another output lead 62 of timer 60 is energized to reverse the switch 48. The latter switch, in its alternate position, lies in series with the return-sensing switch 25 of unit 7 and with an analogous switch 25a of unit 7a. At the same time, current is cut off from valve 52 which is thereupon reset by its biasing spring to admit compressed air to port 10" of cylinder 10 for retraction of brush 11 in unit 7; its companion brush in unit 7a, whose motor and transport jack are also controlled by the timer 60, is retracted concurrently. The resulting closure of switches 25 and 25a, which were opened at the beginning of the brush advance with the pressurization of port 10', extends the voltage present on line 46 to an input lead 105 of programmer 100.

The body-scrubbing program is then restarted as the programmer de-energizes its output leads 103 and 104 while maintaining voltage on lead 102. After a certain period, which may be adjustable by the operator for vehicles of different distances between their front and rear wheels, the programmer 100 again closes the switch 44 for repressurization of port 23' to swing the rod 15 once more across the wheel course as shown in view H of FIG. 5. The subsequent energization of lead 103 initiates a sequence of steps identical with those described before whereby the wheel 8' is scrubbed as shown in view J of FIG. 5. When lead 105 is thereafter energized a second time, the programmer permanently cuts off the leads 103 and 104 while causing the remaining body-scrubbing operations to be performed.

I claim:

1. In an apparatus for washing a wheeled vehicle, including a support movable relatively to a vehicle to be washed and provided with body-scrubbing means, the combination therewith of at least one wheel-cleaning unit on said support comprising:
    rotary wheel-scrubbing means normally laterally retracted from the path of relative vehicle motion;
    reciprocable transport means linking said wheel-scrubbing means with said support;
    normally withdrawn feeler means extendible across the course of a vehicle wheel to be scrubbed;
    actuating means programmed to extend said feeler means upon the approach of said vehicle wheel during relative displacement of said support and said vehicle; and
    switch means triggerable by said feeler means in an extended position thereof, upon contact with said vehicle wheel, for activating said wheel-scrubbing means and commanding said transport means to advance said wheel-scrubbing means into operative engagement with said vehicle wheel.

2. The combination defined in claim 1 wherein said feeler means comprises a rigid member connected with said actuating means via a limitedly yieldable spring-loaded coupling, said switch means being in a normal condition upon said feeler means occupying its withdrawn position, said member coacting with said switch means for establishing an off-normal condition thereof upon displacement into said extended position and for restoring said normal condition upon deflection by said vehicle wheel against the loading force of said coupling.

3. The combination defined in claim 2 wherein said member is a rod lying generally parallel to said path in said withdrawn position and generally perpendicular to said path in said extended position.

4. The combination defined in claim 1, 2 or 3 further comprising control means operable by said switch means for arresting said relative displacement and withdrawing said feeler means prior to said operative engagement.

5. The combination defined in claim 4, further comprising sensing means responsive to a return of said wheel-scrubbing means to its retracted position for initiating a resumption of said relative displacement.

6. The combination defined in claim 5 wherein said wheel-scrubbing means comprises a brush on a horizontal shaft transverse to said path, drive means for rotating said shaft, and a carriage movable on said support by said transport means in the direction of said shaft, said drive means and said brush being mounted on said carriage.

7. The combination defined in claim 6 wherein said transport means comprises a fluidically actuatable jack.

8. The combination defined in claim 1, 2 or 3 wherein said support is a portal frame straddling said path, said wheel-scrubbing means being alignedly duplicated on opposite sides of said portal frame for joint activation by said switch means.

* * * * *